(12) United States Patent
Shirouchi et al.

(10) Patent No.: US 12,252,565 B2
(45) Date of Patent: Mar. 18, 2025

(54) METHOD FOR PRODUCING IONOMER RESIN

(71) Applicant: Kuraray Europe GmbH, Hattersheim (DE)

(72) Inventors: Tomoka Shirouchi, Tsukuba (JP); Kenta Takemoto, Tsukuba (JP); Takuro Niimura, Tsukuba (JP); Atsuhiro Nakahara, Tsukuba (JP); Yoshiaki Asanuma, Kurashiki (JP)

(73) Assignee: KURARAY EUROPE GmbH, Hattersheim (DE)

( * ) Notice: Subject to any disclaimer, the term of this patent is extended or adjusted under 35 U.S.C. 154(b) by 477 days.

(21) Appl. No.: 17/785,464

(22) PCT Filed: Dec. 7, 2020

(86) PCT No.: PCT/JP2020/045447
§ 371 (c)(1),
(2) Date: Jun. 15, 2022

(87) PCT Pub. No.: WO2021/124950
PCT Pub. Date: Jun. 24, 2021

(65) Prior Publication Data
US 2023/0018856 A1    Jan. 19, 2023

(30) Foreign Application Priority Data
Dec. 19, 2019 (JP) .................. 2019-229594

(51) Int. Cl.
*C08F 220/14* (2006.01)
*B32B 17/10* (2006.01)
*C08F 6/16* (2006.01)
*C08F 8/44* (2006.01)
*C08F 210/02* (2006.01)
*C08F 220/06* (2006.01)
*C08F 220/18* (2006.01)
*C08J 3/14* (2006.01)
*C08J 5/18* (2006.01)

(52) U.S. Cl.
CPC ...... *C08F 220/14* (2013.01); *B32B 17/10036* (2013.01); *C08F 6/16* (2013.01); *C08F 8/44* (2013.01); *C08F 210/02* (2013.01); *C08F 220/06* (2013.01); *C08F 220/1802* (2020.02); *C08J 3/14* (2013.01); *C08J 5/18* (2013.01)

(58) Field of Classification Search
CPC ............................ C08F 220/06; C08F 210/02
See application file for complete search history.

(56) References Cited

U.S. PATENT DOCUMENTS

| | | | | |
|---|---|---|---|---|
| 3,658,741 A | * | 4/1972 | Knutson ................. | C08F 22/00 564/204 |
| 3,909,487 A | * | 9/1975 | Waggoner .......... | C09D 123/025 427/195 |
| 3,933,954 A | * | 1/1976 | Gebhard, Jr. ............. | C08J 3/12 264/15 |
| 4,956,418 A | | 9/1990 | Tanaka et al. | |
| 8,399,096 B2 | | 3/2013 | Hausmann et al. | |

FOREIGN PATENT DOCUMENTS

| | | | |
|---|---|---|---|
| GB | 2164342 | * | 3/1986 |
| JP | S60-240704 A | | 11/1985 |
| JP | S63-270709 A | | 11/1988 |
| JP | 5554477 B2 | | 7/2014 |
| JP | 2018154519 A | | 10/2018 |

OTHER PUBLICATIONS

Huang, Polymer International 52:819-826 (2003) (Year: 2003).*
Cui, Macromolecules, vol. 42, Issue 7, p. 2309-2880, 2009 (Year: 2009).*
Gebel, J. Phys. Chem. B 1997, 101, 3980-3987 (Year: 1997).*
English translation of the International Preliminary Report on Patentability and Written Opinion issued Jun. 30, 2022 in PCT/JP2020/045447, 6 pages.
International Search Report issued Feb. 9, 2021 in PCT/JP2020/045447, 2 pages.
U.S. Appl. No. 17/786,568, filed Jun. 17, 2022, Tomoka Shirouchi.

* cited by examiner

*Primary Examiner* — Robert C Boyle
(74) *Attorney, Agent, or Firm* — Element IP, PLC

(57) ABSTRACT

The present invention relates to a method of manufacturing an ionomer resin, comprising the steps of: (i) adding a poor solvent to a crude ionomer resin solution comprising a (meth)acrylic acid unit (A), a neutralized (meth)acrylic acid unit (B) and an ethylene unit (C) to allow a granular resin with a peak top particle size of from 50 to 700 μm to be precipitated; and (ii) washing the precipitated granular resin with a washing solution; wherein the total amount of the unit (A) and the unit (B) is from 6 to 10 mol % based on the entire monomeric units constituting the crude ionomer resin.

8 Claims, No Drawings

METHOD FOR PRODUCING IONOMER RESIN

TECHNICAL FIELD

This application claims Paris Convention priority from JP 2019-229594 A (filing date: Dec. 19, 2019), which is incorporated herein by reference in its entirety.

The present invention relates to a method of manufacturing an ionomer resin, a pellet containing the ionomer resin, a resin sheet having one or more layer comprising the pellet as a resin component, a laminated glass interlayer comprising the resin sheet, and a laminated glass having the laminated glass interlayer.

BACKGROUND ART

One known method of manufacturing ionomer resins includes a step of saponifying a copolymer, which is an ethylene-(meth)acrylic acid ester copolymer used as a raw material (hereinafter, also referred to as "EMMA saponification method") (e.g., Patent Documents 1 to 3). An advantage of this method is that it does not require corrosion-resistant facilities in contrast to other methods of manufacturing ionomer resins comprising a step of copolymerizing ethylene and (meth)acrylic acid (e.g., Patent Document 4), which require corrosion-resistant facilities. Furthermore, the EMMA saponification method can be used to manufacture ionomer resins with various copolymerization compositions.

PRIOR ART REFERENCES

Patent Documents

Patent Document 1: JP S60-240704 A
Patent Document 2: JP 5554477 B2
Patent Document 3: JP S63-270709 A
Patent Document 4: U.S. Pat. No. 8,399,096 B2

SUMMARY OF THE INVENTION

Problems to be Solved by the Invention

However, investigations by the present inventors have demonstrated that involvement of saponification reactions with alkalis and demetalation reactions with acids in the EMMA saponification method results in production of salts through neutralization reactions between the alkalis and the acids, which produced salts may cause deterioration of the transparency of the ionomer resin, especially the transparency when the ionomer resin has absorbed water. Thus, in an attempt by the present inventors, the reaction solution after saponification reactions and demetalation reactions have been added to a poor solvent for ionomer resins and allowed to undergo precipitation in order to remove the salts produced by the reactions from the ionomer resin (hereinafter, also referred to as "reprecipitation method"). However, it has been found that efficient manufacturing of ionomer resins is difficult using the reprecipitation method, due to the need for a long period of time for the steps of separating and purifying the precipitated ionomer resin and the inability to sufficiently remove the salts.

Thus, an object of the present invention is to provide methods of efficiently manufacturing ionomer resins with excellent transparency by improving the removal of salts produced in an EMMA saponification method.

Means for Solving the Problems

In order to solve the above problems, the present inventors have intensively studied to find that the need, by the reprecipitation method, for a long period of time for the steps of separating and purifying the precipitated ionomer resin and the inability to sufficiently remove the salts is caused by the particle sizes of the ionomer resins to be precipitated in the reprecipitation method being heterogeneous and/or large. Thus, the present inventors have made further investigation on methods for allowing ionomer resins having particle sizes within a specific range to be precipitated, and thereby achieved the present invention. Accordingly, the present invention provides the following aspects.

[1] A method of manufacturing an ionomer resin, comprising the steps of:
(i) adding a poor solvent to a crude ionomer resin solution comprising a (meth)acrylic acid unit (A), a neutralized (meth)acrylic acid unit (B), and an ethylene unit (C) to allow a granular resin with a peak top particle size of from 50 to 700 µm to be precipitated; and
(ii) washing the precipitated granular resin with a washing solution;
wherein the total amount of the unit (A) and the unit (B) is from 6 to 10 mol % based on the entire monomeric units constituting the crude ionomer resin.

[2] The method of manufacturing an ionomer resin according to [1],
wherein the crude ionomer resin further comprises a (meth)acrylic acid ester unit (D); and
wherein the total amount of the unit (A), the unit (B), and the unit (D) is from 6 to 10 mol % based on the entire monomeric units constituting the crude ionomer resin.

[3] The method of manufacturing an ionomer resin according to [1] or [2], wherein the concentration of the crude ionomer resin in the solution is from 1 to 30% by mass.

[4] The method of manufacturing an ionomer resin according to any one of [1] to [3], wherein the temperature of the crude ionomer resin solution is from 25 to 60° C.

[5] The method of manufacturing an ionomer resin according to any one of [1] to [4], wherein the poor solvent is water, an alcohol, or a mixed solvent thereof.

[6] The method of manufacturing an ionomer resin according to any one of [1] to [5], wherein the washing solution is water, an alcohol, or a mixed solution thereof.

[7] The method of manufacturing an ionomer resin according to any one of [1] to [6], wherein the amount of a salt formed by a strong acid and a strong base in the ionomer resin is 1,000 mg/kg or less.

[8] The method of manufacturing an ionomer resin according to any one of [1] to [7], wherein the amount of a salt composed of a strong acid and a strong base in the ionomer resin is 400 mg/kg or less.

[9] A pellet comprising an ionomer resin obtained by the manufacturing method according to any one of [1] to [8].

[10] A resin sheet having one or more layer comprising the pellet according to [9] as a resin component.

[11] A laminated glass interlayer comprising the resin sheet according to [10].

[12] A laminated glass comprising two glass plates, and the laminated glass interlayer according to [11], positioned between the two glass plates.

Effect of the Invention

According to the present invention, methods of efficiently manufacturing ionomer resins with excellent transparency by improving the removal of salts produced in an EMMA saponification method can be provided.

DETAILED DESCRIPTION OF THE INVENTION

[Method of Manufacturing Ionomer Resin]

The method of manufacturing an ionomer resin of the present invention comprises a step (i) of adding a poor solvent to a crude ionomer resin solution comprising a (meth)acrylic acid unit (A), a neutralized (meth)acrylic acid unit (B), and an ethylene unit (C) to allow a granular resin with a peak top particle size of from 50 to 700 μm to be precipitated; and a step (ii) of washing the precipitated granular resin with a washing solution.

<Step (i)>

(Crude Ionomer Resin)

The crude ionomer resin in the step (i) comprises a (meth)acrylic acid unit (A), a neutralized (meth)acrylic acid unit (B), and an ethylene unit (C), wherein the total amount of the unit (A) and the unit (B) is from 6 to 10 mol % based on the entire monomeric units constituting the crude ionomer resin.

As used herein, the term "unit" means "-derived constitutional unit." For example, the term "(meth)acrylic acid unit" represents a (meth)acrylic acid-derived constitutional unit; the term "neutralized (meth)acrylic acid unit" represents a neutralized (meth)acrylic acid-derived constitutional unit; and the term "ethylene unit" represents an ethylene-derived constitutional unit. As used herein, the term "(meth)acrylic acid" represents methacrylic acid or acrylic acid.

When the total amount is more than the upper limit value, the increase in the melt viscosity of the ionomer resin during the molding process is unlikely to be reduced, and thus the molding processability of the ionomer resin is likely to be deteriorated. When the total amount is less than the lower limit value, the transparency of the ionomer resin, especially when the crystallization of the ionomer resin is facilitated by slow cooling (hereinafter, also referred to as "transparency after slow cooling"), is likely to be deteriorated. The total amount is 6 mol % or more, preferably 6.5 mol % or more, more preferably 7.0 mol % or more, and still more preferably 7.5 mol % or more from the viewpoint that the transparency (especially, transparency after slow cooling) of the ionomer resin and the adhesiveness to substrates such as glass are likely to be improved, and is 10 mol % or less, preferably 9.9 mol % or less, and more preferably 9.5 mol % or less from the viewpoint that the molding processability is likely to be improved.

The total amount of the unit (A) and the unit (B) can be adjusted according to the method of manufacturing a crude ionomer resin as described later. More specifically, the adjustment can be made by the reactivity (conversion rate) of the reactions to convert (meth)acrylic acid ester units in the ethylene-(meth)acrylic acid ester copolymer that is a raw material of the crude ionomer resin into the (meth)acrylic acid unit (A) and the neutralized (meth)acrylic acid unit (B) via the saponification reaction and demetalation reaction.

Examples of the monomer constituting the (meth)acrylic acid unit (A) include acrylic acid and methacrylic acid, and methacrylic acid is preferable from the viewpoint of heat resistance and adhesiveness to substrates. These (meth)acrylic acid units may be used alone or in combination of the two types.

The amount of the (meth)acrylic acid unit (A) in the crude ionomer resin is not particularly limited as long as the total amount of the unit (A) and the unit (B) is within the range from 6 to 10 mol % based on the entire monomeric units constituting the crude ionomer resin. In one embodiment of the present invention, the amount of the (meth)acrylic acid unit (A) in the crude ionomer resin is preferably 4.5 mol % or more, more preferably 5.0 mol % or more, still more preferably 5.5 mol % or more, and particularly preferably 5.8 mol % or more, and is preferably 9.0 mol % or less, more preferably 8.5 mol % or less, still more preferably 8.0 mol % or less, and particularly preferably 7.5 mol % or less, based on the entire monomeric units constituting the crude ionomer resin. When the amount of the unit (A) is the lower limit value or more, the transparency and the adhesiveness to substrates of the ionomer resin are likely to be improved. When the amount is the upper limit value or less, the molding processability is likely to be improved.

Preferably, the neutralized (meth)acrylic acid unit (B) is a neutralized unit of the (meth)acrylic acid unit (A). The neutralized (meth)acrylic acid is obtained by substituting the hydrogen ion in the (meth)acrylic acid with a metal ion. Examples of the metal ion include monovalent metal ions such as lithium, sodium, and potassium, and multivalent metal ions such as magnesium, calcium, zinc, aluminum, and titanium. These metal ions may be used alone or in combination of two or more. For example, one or more monovalent metal ion and one or more divalent metal ion may be combined.

The amount of the neutralized (meth)acrylic acid unit (B) in the crude ionomer resin is not particularly limited as long as the total amount of the unit (A) and the unit (B) is within the range from 6 to 10 mol % based on the entire monomeric units constituting the crude ionomer resin. In one embodiment of the present invention, the amount of the neutralized (meth)acrylic acid unit (B) is preferably 0.65 mol % or more, more preferably 1.0 mol % or more, still more preferably 1.5 mol % or more, and particularly preferably 1.7 mol % or more, and is preferably 3.0 mol % or less, more preferably 2.7 mol % or less, still more preferably 2.6 mol % or less, and particularly preferably 2.5 mol % or less, based on the entire monomeric units constituting the crude ionomer resin. When the amount of the unit (B) is the lower limit value or more, the transparency and the elastic modulus are likely to be improved. When the amount is the upper limit or less, the increase of the melt viscosity during the molding process is likely to be reduced.

The amounts of the unit (A) and the unit (B), when an ethylene-(meth)acrylic acid ester copolymer is used as a raw material, and when an ionomer resin is manufactured by a method comprising subjecting the copolymer to a saponification reaction process and a demetalation reaction process, can be adjusted by the reactivity of the reactions to convert (meth)acrylic acid ester units in the ethylene-(meth)acrylic acid ester copolymer into the (meth)acrylic acid unit (A) and the neutralized (meth)acrylic acid unit (B) via the saponification reaction and demetalation reaction.

The amount of the ethylene unit (C) based on the entire monomeric units constituting the crude ionomer resin is preferably 80 mol % or more, more preferably 85 mol % or more, and still more preferably 88 mol % or more from the viewpoint that the impact resistance of the ionomer resin is likely to be improved, and is preferably 94 mol % or less, and more preferably 91 mol % or less from the viewpoint that the transparency (especially, transparency after slow cooling) of the ionomer resin is likely to be improved. When the amount of the ethylene unit (C) is the lower limit value or more, the mechanical properties and the molding processability are likely to be improved. When the amount is the upper limit or less, the transparency is likely to be improved.

In addition to the (meth)acrylic acid unit (A), the neutralized (meth)acrylic acid unit (B), and the ethylene unit (C), the crude ionomer resin preferably further comprises a (meth)acrylic acid ester unit (D) from the viewpoint of easily achieving higher transparency.

When the crude ionomer resin comprises a (meth)acrylic acid ester unit (D), the total amount of the unit (A), the unit (B), and the unit (D) is preferably from 6 to 10 mol % based on the entire monomeric units constituting the ionomer resin from the viewpoint that the transparency (especially transparency after slow cooling) is likely to be improved. In other words, in preferred embodiments of the present invention, the crude ionomer resin comprises a (meth)acrylic acid unit (A), a neutralized (meth)acrylic acid unit (B), an ethylene unit (C), and a (meth)acrylic acid ester unit (D), wherein the total amount of the unit (A), the unit (B), and the unit (D) is from 6 to 10 mol % based on the entire monomeric units constituting the ionomer resin. When the crude ionomer resin comprises a (meth)acrylic acid ester unit (D), and when the total amount of the unit (A), the unit (B), and the unit (D) is the upper limit value or less, the increase in the melt viscosity of the ionomer resin during the molding process is likely to be reduced, and thus the molding processability of the ionomer resin is likely to be improved. When the total amount is the lower limit or more, the transparency, especially the transparency after slow cooling, of the ionomer resin is likely to be improved.

When the crude ionomer resin comprises a (meth)acrylic acid ester unit (D), the total amount of the unit (A), the unit (B), and the unit (D) is 6 mol % or more, preferably 6.5 mol % or more, more preferably 7.0 mol % or more, and still more preferably 7.5 mol % or more from the viewpoint that the transparency (especially the transparency after slow cooling) and the adhesiveness to substrates are likely to be improved, and is 10 mol % or less, preferably 9.9 mol % or less, and more preferably 9.5 mol % or less from the viewpoint of the molding processability.

The total amount of the unit (A), the unit (B), and the unit (D) can be adjusted by raw materials of the crude ionomer resin. Specifically, the adjustment can be made by the amount of a (meth)acrylic acid ester modification of the ethylene-(meth)acrylic acid ester copolymer that is a raw material of the crude ionomer resin.

Examples of the monomer constituting the (meth)acrylic acid ester unit (D) include methyl (meth)acrylate, ethyl (meth)acrylate, n-propyl (meth)acrylate, isopropyl (meth) acrylate, n-butyl (meth)acrylate, isobutyl (meth)acrylate, sec-butyl (meth)acrylate, t-butyl (meth)acrylate, amyl (meth)acrylate, isoamyl (meth)acrylate, n-hexyl (meth)acrylate, cyclohexyl (meth)acrylate, 2-ethylhexyl (meth)acrylate, pentadecyl (meth)acrylate, dodecyl (meth)acrylate, isobornyl (meth)acrylate, phenyl (meth)acrylate, benzyl (meth)acrylate, phenoxyethyl (meth)acrylate, 2-hydroxyethyl (meth)acrylate, 2-methoxyethyl (meth)acrylate, glycidyl (meth)acrylate, and allyl (meth)acrylate.

Among them, preferred monomers are methyl (meth) acrylate, ethyl (meth)acrylate, n-propyl (meth)acrylate, isopropyl (meth)acrylate, n-butyl (meth)acrylate, isobutyl (meth)acrylate, sec-butyl (meth)acrylate, and t-butyl (meth) acrylate from the viewpoint of transparency or heat resistance, and more preferred monomers are methyl (meth) acrylate, ethyl (meth)acrylate, n-propyl (meth)acrylate, isopropyl (meth)acrylate, n-butyl (meth)acrylate, and isobutyl (meth)acrylate, still more preferred monomers are methyl (meth)acrylate, n-butyl (meth)acrylate, and isobutyl (meth)acrylate, and a particularly preferred monomer is methyl (meth)acrylate. These (meth)acrylic acid esters may be used alone or in combination of two or more.

When the crude ionomer resin comprises a (meth)acrylic acid ester unit (D), the amount of the (meth)acrylic acid ester unit (D) in the crude ionomer resin is not particularly limited. In one embodiment of the present invention, the amount of the (meth)acrylic acid ester unit (D) in the crude ionomer resin based on the entire monomeric units constituting the crude ionomer resin is preferably more than 0 mol %, more preferably 0.01 mol % or more, still more preferably 0.05 mol % or more, and particularly preferably 0.08 mol % or more, and is preferably 1.0 mol % or less, more preferably 0.7 mol % or less, and still more preferably 0.5 mol % or less. When the amount of the unit (D) is the lower limit value or more and the upper limit or less, the transparency of the ionomer resin is likely to be improved.

When the crude ionomer resin comprises a (meth)acrylic acid ester unit (D), the amount of the unit (D), when an ethylene-(meth)acrylic acid ester copolymer is used as a raw material, and when an ionomer resin is manufactured by a method comprising subjecting the copolymer to a saponification reaction process and a demetalation reaction process, can be adjusted by the reactivity of the saponification reaction to convert the (meth)acrylic acid ester unit (D) in the ethylene-(meth)acrylic acid ester copolymer into a (meth)acrylic acid unit (A).

In one embodiment of the present invention, the crude ionomer resin may comprise other monomeric units other than a (meth)acrylic acid unit (A), a neutralized (meth) acrylic acid unit (B), an ethylene unit (C) and a (meth) acrylic acid ester unit (D) which is optionally contained. Examples of the other monomeric units include a carboxylic acid unit (A2) other than the (meth)acrylic acid unit, and a neutralized carboxylic acid unit (B2) other than the neutralized (meth)acrylic acid unit. Examples of the monomer constituting the carboxylic acid unit (A2) include itaconic acid, maleic anhydride, monomethyl maleate, and monoethyl maleate, and monomethyl maleate and monoethyl maleate is preferable. An example of the monomer constituting the neutralized carboxylic acid unit (B2) includes a neutralized unit of the carboxylic acid unit (A2). The neutralized carboxylic acid is obtained by substituting the hydrogen ion in carboxylic acid with a metal ion. Examples of the metal ion include the same metal ions as in the neutralized (meth)acrylic acid unit (B) as described above, and the metal ions may be used alone or in combination of two or more.

These other monomeric units may be used alone or in combination of two or more.

When the crude ionomer resin comprises the other monomeric units, the total amount of the other monomeric units, e.g., the total amount of (A2) and (B2), may be selected as appropriate without impairing the effects of the invention, and is, for example, preferably 5 mol % or less, more preferably 3 mol % or less, and still more preferably 1 mol % or less, and is preferably 0.01 mol % or more, and more preferably 0.1 mol % or more, based on the entire monomeric units constituting the crude ionomer resin.

The amounts of the (meth)acrylic acid unit (A), the neutralized (meth)acrylic acid unit (B), and the ethylene unit (C), as well as the (meth)acrylic acid ester unit (D) and the other monomeric units (e.g., the unit (A2) and the unit (B2))

when contained, in the crude ionomer resin according to the present invention can be determined by first identifying the monomeric units in the ionomer resin by pyrolysis gas chromatography, and then performing nuclear magnetic resonance spectroscopy (NMR) and elementary analysis. Since the amounts of monomeric units in an ionomer resin obtained by the manufacturing method of the present invention correspond to the amounts of the monomeric units in a crude ionomer resin, the amounts of monomeric units in a crude ionomer resin may be also determined by analyzing the obtained ionomer resin instead of crude ionomer resin, and more specifically can be determined by the methods described in Examples. The amounts can also be determined by a method combining the analysis described above and IR and/or Raman analysis. Preferably, components other than the crude ionomer resin or the obtained ionomer resin are removed by a reprecipitation method or a Soxhlet extraction method before these analyses.

(Method of Manufacturing Crude Ionomer Resin)

The method of manufacturing a crude ionomer resin is not particularly limited, and may be, for example, a method in which using an ethylene-(meth)acrylic acid ester copolymer (X) as a raw material, all or some of (meth)acrylic acid ester units in the copolymer are converted to (meth)acrylic acid units and neutralized (meth)acrylic acid units.

The method of converting all or some of the (meth)acrylic acid ester units to (meth)acrylic acid units and neutralized (meth)acrylic acid units may be a method (hereinafter, also referred to as "method (1)") comprising subjecting the ethylene-(meth)acrylic acid ester copolymer (X) to saponification with alkali to convert some of the (meth)acrylic acid ester units to neutralized (meth)acrylic acid units and obtain an ethylene-(meth)acrylic acid ester-neutralized (meth)acrylic acid copolymer, and then demetallizing some of the neutralized (meth)acrylic acid units in the obtained copolymer with an acid to convert them to (meth)acrylic acid units.

The method other than the method (1) may be a method (hereinafter, also referred to as "method (2)") comprising demetallizing all of the neutralized (meth)acrylic acid units in the ethylene-(meth)acrylic acid ester-neutralized (meth)acrylic acid copolymer obtained by saponification in the method (1) with an acid to convert them to (meth)acrylic acid units and obtain an ethylene-(meth)acrylic acid copolymer, and then neutralizing some of the (meth)acrylic acid units in the obtained copolymer with an metal ion.

Of the methods (1) and (2), the method (1) is preferably used for manufacturing crude ionomer resins from the viewpoint that of easily reducing the number of reactions and improving the efficiency of manufacturing ionomer resins.

Examples of the monomer constituting the (meth)acrylic acid ester unit of the ethylene-(meth)acrylic acid ester copolymer (X) include methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, t-butyl (meth)acrylate, amyl (meth)acrylate, isoamyl (meth)acrylate, n-hexyl (meth) acrylate, cyclohexyl (meth) acrylate, 2-ethylhexyl (meth)acrylate, pentadecyl (meth)acrylate, dodecyl (meth)acrylate, isobornyl (meth) acrylate, phenyl (meth) acrylate, benzyl (meth) acrylate, phenoxyethyl (meth) acrylate, 2-hydroxyethyl (meth) acrylate, 2-methoxyethyl (meth)acrylate, glycidyl (meth)acrylate, and allyl (meth)acrylate. Among them, preferred monomers are methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, and t-butyl (meth)acrylate, more preferred monomers are methyl (meth)acrylate, ethyl (meth)acrylate, n-propyl (meth)acrylate, isopropyl (meth)acrylate, n-butyl (meth)acrylate, and isobutyl (meth)acrylate, still more preferred monomers are methyl (meth)acrylate, n-butyl (meth)acrylate, and isobutyl (meth)acrylate, and a particularly preferred monomer is methyl (meth)acrylate. These (meth)acrylic acid esters may be used alone or in combination of two or more.

Specific examples of the ethylene-(meth)acrylic acid ester copolymer (X) include ethylene-methyl acrylate copolymer, ethylene-methyl methacrylate copolymer, ethylene-ethyl acrylate copolymer, ethylene-ethyl methacrylate copolymer, ethylene-n-propyl acrylate copolymer, ethylene-n-propyl methacrylate copolymer, ethylene-isopropyl acrylate copolymer, ethylene-isopropyl methacrylate copolymer, ethylene-n-butyl acrylate copolymer, ethylene-n-butyl methacrylate copolymer, ethylene-sec-butyl acrylate copolymer, and ethylene-sec-butyl methacrylate copolymer.

The copolymer used may be commercially available, or synthesized by high-temperature high-pressure radical polymerization described in US 2013/0274424 A, JP 2006-233059 A, or JP 2007-84743 A. Examples of the commercially available copolymer include "ACRYFT" (Registered Trademark) WD301F, produced by Sumitomo Chemical Co., Ltd., and "REXPEARL" (Registered Trademark) A4250, produced by Japan polyethylene Corporation.

The amount of the (meth)acrylic acid ester unit in the ethylene-(meth)acrylic acid ester copolymer (X) is preferably 6 mol % or more, more preferably 6.5 mol % or more, still more preferably 7 mol % or more, and particularly preferably 7.5 mol % or more, and is preferably 10 mol % or less, more preferably 9.9 mol % or less, and still more preferably 9.5 mol % or less. The total amount of the (meth)acrylic acid unit (A) and the neutralized (meth)acrylic acid unit (B), as well as the (meth)acrylic acid ester unit (D), when included, in the crude ionomer resin and ionomer resin to be obtained can be adjusted by the amount of the (meth)acrylic acid ester unit in the copolymer (X). Thus, when the amount of the (meth)acrylic acid ester unit in the copolymer (X) is the lower limit value or more, the transparency, especially the transparency after slow cooling, of the obtained ionomer resin is likely to be improved. When the amount is the upper limit value or less, the molding processability of the obtained ionomer resin is likely to be improved.

The amount described above can be adjusted by the copolymerization ratio between ethylene and (meth)acrylic acid ester. The amount can be determined, similar to the amounts of the (meth)acrylic acid unit (A), the neutralized (meth)acrylic acid unit (B), and the ethylene unit (C), as well as the (meth)acrylic acid ester unit (D) and the other monomeric units (e.g., the unit (A2) and the unit (B2)) when contained, in the crude ionomer resin as described above, by pyrolysis gas chromatography, nuclear magnetic resonance spectroscopy (NMR), and elementary analysis.

In one embodiment of the present invention, the Melt Flow Rate (MFR) of the ethylene-(meth)acrylic acid ester copolymer (X) as measured according to JIS K7210-1:2014 at 190° C. and 2.16 Kg, is preferably 5 g/10 min or more, more preferably 10 g/10 min or more, still more preferably 50 g/10 min or more, and even still more preferably 100 g/10 min or more, and is preferably 400 g/10 min or less, more preferably 350 g/10 min or less, still more preferably 300 g/10 min or less, and even still more preferably 250 g/10 min or less. When the MFR of the ethylene-(meth)acrylic acid ester copolymer (X) is the lower limit value or more and the upper limit value or less, the molding processability and strength of the obtained ionomer resin are likely to be improved. The MFR of the ethylene-(meth)acrylic acid ester copolymer (X) can be adjusted by the degree of polymerization and the amount of the (meth)acrylic acid ester unit. The MFR can be measured, for example, by methods described in Examples.

The weight average molecular weight of the ethylene-(meth)acrylic acid ester copolymer (X) is preferably 15,000 g/mol or more, more preferably 20,000 g/mol or more, and still more preferably 30,000 g/mol or more, and is preferably 200,000 g/mol or less, and more preferably 100,000 g/mol or less from the viewpoint that the molding processability and the strength of the obtained ionomer resin are likely to be improved. From the same viewpoint, the number average molecular weight of the ethylene-(meth)acrylic acid ester copolymer (X) is preferably 5,000 g/mol or more, more preferably 10,000 g/mol or more, and still more preferably 15,000 g/mol or more, and is preferably 100,000 g/mol or less, and more preferably 50,000 g/mol or less. The weight average molecular weight and the number average molecular weight can be adjusted by the polymerization initiator and/or the amount of the chain transfer agent during polymerization. The molecular weight (weight average molecular weight and number average molecular weight) of the ethylene-(meth)acrylic acid ester copolymer (X) can be measured using a column (three TSKgel $GMH_{H\ R}$-H(20)HT in tandem) and a 1,2,4-trichlorobenzene solvent at a column temperature of 140° C. in terms of polystyrene.

The degree of branching per 1,000 carbons in the ethylene-(meth)acrylic acid ester copolymer (X) is not particularly limited, and is preferably from 5 to 30, and more preferably from 6 to 20. The degree of branching can be adjusted by the polymerization temperature during polymerization of the copolymer (X). The degree of branching per 1,000 carbons can be measured by dissolving the ethylene-(meth)acrylic acid ester copolymer (X) in deuterated ortho-dichlorobenzene and performing inverse gated decoupling $^{13}C$-NMR.

Examples of the alkali used in the saponification reaction in the methods (1) and (2) described above include strong bases such as sodium hydroxide, potassium hydroxide, and calcium hydroxide, and the alkali is preferably sodium hydroxide or potassium hydroxide from the view point of the solubility in the solvent used in the saponification reaction and the economy.

Examples of the solvent used in the saponification reaction include ethers such as tetrahydrofuran and dioxane; halogen-containing solvents such as chloroform and dichlorobenzene; ketones with a carbon number of 6 or more such as methyl butyl ketone; mixed solvents of a hydrocarbon compound and an alcohol such as methanol, ethanol, 1-propanol, 2-propanol, or 1-butanol; aromatic compounds such as benzene, toluene, xylene, and ethylbenzene; and mixed solvents of an aromatic compound and an alcohol. These solvents may be used alone or in combination of two or more.

Among these, the solvent is preferably a mixed solvent of a hydrocarbon compound and an alcohol, or a mixed solvent of an aromatic compound and an alcohol, and more preferably a mixed solvent of an aromatic compound such as toluene and an alcohol such as methanol, from the viewpoint of the solubility of the resin before and after the saponification reaction. The ratio of a hydrocarbon compound or an aromatic compound to an alcohol in the mixed solvent may be selected as appropriate depending on the type of the solvent used. For example, the mass ratio of a hydrocarbon compound or an aromatic compound to an alcohol (hydrocarbon compound or aromatic compound/alcohol) may be from 50/50 to 90/10.

The temperature during the saponification reaction is preferably 50° C. or higher, more preferably 60° C. or higher, still more preferably 70° C. or higher, and particularly preferably 80° C. or higher from the viewpoint of the reactivity and the solubility of the ethylene-(meth)acrylic acid ester copolymer (X). The upper limit of the temperature is not particularly limited as long as it is lower than the temperature at which the ethylene-(meth)acrylic acid ester copolymer (X) decomposes, and is, for example, 300° C. or lower.

The saponification reaction may be performed in the air, or in an inert gas such as nitrogen gas or argon gas. The saponification reaction may be performed either under normal pressure, under increased pressure, or under reduced pressure, and is preferably performed under increased pressure.

Examples of the acid used in demetallization in the methods (1) and (2) include strong acids such as hydrochloric acid, nitric acid, sulfuric acid, and toluenesulfonic acid. Preferably, the acid is an inorganic acid such as hydrochloric acid, nitric acid, or sulfuric acid from the viewpoint of ease of removal of the salt after demetallization. The same solvent as that used in the saponification reaction can be selected as a solvent used in the demetallization.

The temperature during the demetallization is preferably 20° C. or higher, more preferably 30° C. or higher, and still more preferably 40° C. or higher, and is preferably 100° C. or lower, more preferably 80° C. or lower, and still more preferably 60° C. or lower from the viewpoint of the solubility of the resin and the viewpoint that the viscosity of the reaction solution is likely to be lowered.

Similar to the saponification reaction, the demetallization may also be performed in the air, or in an inert gas such as a nitrogen gas or an argon gas. The saponification reaction may be performed either under normal pressure, under increased pressure, or under reduced pressure, and is preferably performed under increased pressure.

The neutralizer used in neutralization of some (meth)acrylic acid units to convert them to neutralized (meth)acrylic acid units in the method (2) is not particularly limited as long as it is an ionic compound comprising a metal ion. Examples of the metal ion include alkali metal ions such as lithium, potassium, and sodium; alkali earth metal ions such as magnesium and calcium; transition metal ions such as zinc, nickel, iron, and titanium; and aluminum ion. For example, when the metal ion is a sodium cation, examples of the neutralizer include sodium hydroxide, sodium acetate, and sodium bicarbonate. In addition, polymers such as ionomer resins comprising sodium (meth)acrylate units can also be used as the neutralizer.

(Crude Ionomer Resin Solution)

The crude ionomer resin solution in the step (i) can be prepared by dissolving the crude ionomer resin in a solvent. A reaction solution of the crude ionomer resin obtained by manufacturing the crude ionomer resin according to the method (1) or (2) may be used as the crude ionomer resin solution.

The solvent in the crude ionomer resin solution is not particularly limited as long as it is a solvent in which the crude ionomer resin can be dissolved, and examples are the same solvents as those used in the saponification reaction. Among them, mixed solvents of an aromatic compound such as toluene, and an alcohol such as methanol, are preferable from the viewpoint of the solubility of the crude ionomer resin. The ratio of an aromatic compound to an alcohol in the mixed solvent may be selected as appropriate depending on the type of the solvent used. For example, the mass ratio of an aromatic compound to an alcohol (aromatic compound/alcohol) may be from 50/50 to 90/10, and preferably from 65/35 to 85/15.

In preferred embodiments of the present invention, the concentration of the crude ionomer resin in the solution is from 1 to 30% by mass. The concentration is preferably 30% by mass or less, and more preferably 15% by mass or less, from the viewpoint that lower concentration of the crude ionomer resin solution leads to more deposition of granular resins with small peak top particle sizes, and as a result, the removal of salts in the granular resins is likely to be improved. The concentration is preferably 1% by mass or more, and more preferably 5% by mass or more, from the viewpoint that excessive reduction of the peak top particle size of the granular resins is prevented, and the efficiency of the step of separating and purifying the granular resins is likely to be improved.

In preferred embodiments of the present invention, the temperature of the crude ionomer resin solution is from 25 to 60° C. The temperature is preferably the melting point or lower of the ionomer resin, more preferably 60° C. or lower, and still more preferably 50° C. or lower from the viewpoint of facilitating the prevention of aggregation or agglutination of granular resins to be precipitated. The temperature is more preferably 25° C. or higher, and still more preferably 30° C. or higher from the viewpoint of the fluidity of the crude ionomer resin solution. The temperature may be selected as appropriate depending on the concentration of the crude ionomer resin solution. When the concentration of the crude ionomer resin solution is relatively low, the granular resins to be precipitated are less likely to aggregate or agglutinate, and thus the temperature of the crude ionomer resin solution can be relatively high.

(Poor Solvent)

The poor solvent to be added to the crude ionomer resin solution is not particularly limited, as long as it is a solvent which can mix with the crude ionomer resin solution and cannot dissolve the ionomer resin. Examples of the poor solvent include alcohols such as methanol, ethanol, 1-propanol, 2-propanol, and 1-butanol; water; ketones such as acetone and methyl ethyl ketone; esters such as methyl acetate and ethyl acetate; ethers such as dimethyl ether, diethyl ether, and tetrahydrofuran; and hydrocarbon compounds such as n-hexane, cyclohexane, and heptane. Among them, the poor solvent is preferably an alcohol such as methanol or 2-propanol, water, or a mixed solvent thereof, and more preferably an alcohol such as methanol from the viewpoints that it has a low boiling point and thus the ionomer resin is easily dried, and that salts can be dissolved in it and thus the salts in the granular resins are easily removed.

The amount of the poor solvent to be added may be selected as appropriate depending on the concentration of the crude ionomer resin solution. For example, the amount of the poor solvent to be added is preferably 30 parts by mass or more, more preferably 60 parts by mass or more, and particularly preferably 100 parts by mass or more relative to 100 parts by mass of the crude ionomer resin solution. The upper limit of the amount of the poor solvent to be added is not particularly limited, and the upper limit of the amount of the poor solvent to be added is usually 1,000 parts by mass or less relative to 100 parts by mass of the crude ionomer resin solution.

The method of adding the poor solvent to the crude ionomer resin solution is not particularly limited. For example, the poor solvent may be added to the crude ionomer resin solution at once, or in divided portions by dropwise addition or the like. The poor solvent is preferably added in relatively short time period, and more preferably added at once, from the viewpoint that the particle sizes of the granular resins are likely to be reduced, and thus the removal of salts in the granular resins is likely to be improved, and as a result, the transparency of the ionomer resin is likely to be improved. When the poor solvent is added in divided portions, the addition of the poor solvent is completed preferably in 1 hour, more preferably in 30 minutes, and still more preferably in 10 minutes.

In one embodiment of the present invention, after addition of the poor solvent to the crude ionomer resin solution, the mixed solution of the crude ionomer resin solution and the poor solvent is preferably stirred. The stirring rate is not particularly limited, and the faster the stirring rate is, the more granular resins with small peak top particle size are obtained. The stirring time is not particularly limited, and stirring is required to be continued, for example, until the granular resins are precipitated, and the mixed solution of the crude ionomer resin solution and the poor solvent becomes a slurry. Specifically, the stirring time is preferably from 1 second to 3 hours, more preferably from 10 seconds to 1 hour, and still more preferably from 1 minute to 30 minutes.

(Granular Resin)

In the present invention, the peak top particle size of the granular resins to be precipitated by adding a poor solvent to a crude ionomer resin solution is from 50 to 700 μm. The inventors have investigated the particle size that permits efficient removal of salts from the granular resins that contains the salts produced by the saponification and demetalation reactions. As a result, they have found that when the particle size is too large, the removal of the salts is deteriorated, so that the transparency of the ionomer resin is likely to be deteriorated, while when the particle size is too small, the filterability is deteriorated, so that it is difficult to produce ionomer resin efficiently. Based on this, the present inventors have investigated the range of the particle size of the granular resin that can improve the removal of salts while improving the efficiency of the step of separating and purifying the ionomer resin. As a result, they have found that when the peak top particle size of the granular resins is from 50 to 700 μm, salts contained in the granular resins can be efficiently removed, so that an ionomer resin having high transparency even after water absorption can be efficiently manufactured.

In one embodiment of the present invention, the peak top particle size of the granular resins is 50 μm or more, preferably 70 μm or more, and more preferably 80 μm or more. When the particle size is the lower limit value or more, the filterability is likely to be improved, so that the manufacturing efficiency of the ionomer resin is likely to be improved. In one embodiment of the present invention, the peak top particle size of the granular resins is 700 μm or less, preferably 650 μm or less, more preferably 600 μm or less, and still more preferably 550 μm or less. When the particle size is the upper limit value or less, the specific surface areas of the granular resins are larger, and thus the removal of salts contained in the granular resins is likely to be improved, so that the transparency of the ionomer resin, especially the transparency after water absorption, is likely to be improved.

The peak top particle size of granular resins to be precipitated by adding a poor solvent to a crude ionomer resin solution can be adjusted by the concentration and temperature the crude ionomer resin solution. Specifically, when the concentration and/or temperature of the crude ionomer resin solution is lowered, the peak top particle size of the granular resins to be precipitated can be reduced, while when the concentration and/or temperature of the crude ionomer resin solution is raised, the peak top particle size of the granular resin to be precipitated can be increased. The peak top particle size of the granular resins can also be adjusted by the method of adding the poor solvent and the stirring rate of the mixed solution of the crude ionomer resin solution and the poor solvent.

<Step (ii)>

The granular resins with a peak top particle size of from 50 to 700 μm obtained in the step (i) as described above can be washed with a washing solution in a step (ii) to reduce the amount of salts in the granular resins and obtain an ionomer resin with high transparency, especially transparency after water absorption.

(Washing Solution)

The washing solution in the step (ii) is not particularly limited as long as it is a solvent in which the ionomer resin is insoluble and the salts can be dissolved. Preferred examples of the washing solution include alcohols such as methanol, ethanol, 1-propanol, and 2-isopropanol; water; ketones such as acetone and methyl ethyl ketone; esters such as methyl acetate and ethyl acetate; and ethers such as dimethyl ether, diethyl ether, and tetrahydrofuran. These may be used alone or in combination of two or more.

Among the washing solutions described above, the alcohols, water, and mixtures thereof are preferable from the viewpoint of high solubility of salts in them, which facilitates the removal of salts contained in the granular resins. More preferably, the washing solution is a mixture of water and an alcohol, from the viewpoint that, in addition to increasing the solubility of salts, by making the specific gravity of the washing solution lower than that of the granular resins to make the contact area between the washing solution and the granular resins increased, the removal of salts is likely to be improved, the removing of organic compounds and other impurities contained in the granular resins is facilitated, and furthermore the drying of the ionomer resin to be obtained after washing is facilitated. Preferred alcohols are methanol and ethanol, and more preferred is methanol, due to their ease of drying and high compatibility with water.

The ratio of water to an alcohol in the mixture of water and the alcohol (water/alcohol (% by mass)) is preferably from 20/80 to 8/20, and more preferably from 30/70 to 70/30.

The method of washing the granular resins precipitated in the step (i) with a washing solution is not particularly limited, and may be, for example, a method comprising collecting the granular resins by filtration from the granular resin dispersion in which the granular resins have been precipitated in the step (i), mixing the collected granular resins and a washing solution, and then removing the washing solution. More specifically, a method may be used comprising mixing the granular resins collected by filtration from the granular resin dispersion and a washing solution, and separating the granular resins by filtration from the washing solution (hereinafter, also referred to as "washing step (a).") , then mixing the separated granular resins with a fresh washing solution, and separating the granular resins by filtration from the washing solution (hereinafter, also referred to as "washing step (b)"). For washing the granular resins in the case of batch processes, for example, the washing step (b) are performed after one washing step (a) preferably from 1 to 10 times, and the number of the washing step (b) after one washing step (a) is more preferably from 1 to 6 times, and still more preferably from 1 to 4 times, from the viewpoints that the amount of salts contained in the granular resins is reduced, so that an ionomer resin with high transparency, especially transparency after water absorption, is likely to be obtained, and that the efficiency of the step of separating and purifying the ionomer resin is likely to be improved.

The amount of the washing solution used per washing step may be selected as appropriate depending on the amount of the granular resins to be washed. For example, the amount of the washing solution used per washing step is preferably from 100 parts by mass to 2,000 parts by mass, more preferably from 200 parts by mass to 1,000 parts by mass, and still more preferably from 300 parts by mass to 700 parts by mass, relative to 100 parts by mass of the granular resins after drying.

The ionomer resin obtained in the step (ii) may be dried as necessary. The drying temperature may be preferably the melting point of the ionomer resin or lower, and more preferably 80° C. or lower.

[Ionomer Resin]

The ionomer resin obtained according to the present invention comprises a (meth)acrylic acid unit (A), a neutralized (meth)acrylic acid unit (B), and an ethylene unit (C), wherein the total amount of the unit (A) and the unit (B) is from 6 to 10 mol % based on the entire monomeric units constituting the ionomer resin. In addition to the unit (A), the unit (B), and the ethylene unit (C), the ionomer resin may comprise a (meth)acrylic acid ester unit (D), and/or other monomeric units such as a carboxylic acid unit other than the (meth)acrylic acid unit (A2) and a neutralized carboxylic acid unit other than the neutralized (meth)acrylic acid unit (B2).

The unit (A) and the unit (B), as well as, the unit (D), and other monomeric units (A2) and (B2) that are optionally included, in the ionomer resin may be, for example, the same units as the unit (A), unit (B), unit (D), unit (A2), and unit (B2) included in the crude ionomer resin as described above, respectively, and the preferred embodiments are also the same as the crude ionomer resin as described above. Also, the amounts of the units in the ionomer resin, the total amount of the unit (A) and the unit (B), and the total amount of the unit (A), the unit (B), and the unit (D) when the ionomer resin comprises the (meth)acrylic acid ester unit (D), including the preferred embodiments, are the same as the amounts as described for the crude ionomer resin.

The ionomer resin obtained by the present invention contains sufficiently reduced amount of salts that are produced by the neutralization reaction between alkalis and acids in the process of manufacturing the crude ionomer resin, and thus have excellent transparency. The salts that are produced in the process of manufacturing the crude ionomer resin are salts composed of a strong base described above as an alkali used in the saponification reaction and a strong acid described above as an acid used in the demetalation reaction. A single one or a combination of two or more of the salts may be contained. Examples of the salt composed of a strong acid and a strong base, which is produced in the manufacturing process, include lithium salts, sodium salts, potassium salts, rubidium salts, and cesium salts. Preferred examples include alkali metal salts such as lithium salts, sodium salts, and potassium salts; and alkaline earth metal salts such as beryllium salts, magnesium salts, calcium salts, strontium salts, and barium salts. Preferred salts are sodium salts and potassium salts from the viewpoint that the resistance to thermal decomposition of the ionomer resin is likely to be improved. More preferably, the salts may be, for example, composed of at least one cations selected from the group consisting of a sodium ion, a potassium ion, a magnesium ion, and a calcium ion, and at least one anions selected from the group consisting of a halogen ion, a sulfate ion, a nitrate ion, and a sulfonate ion. The salts are preferably composed of at least one cations selected from the group consisting of a sodium ion and a potassium ion and at least one anions selected from the group consisting of a halogen ion, a sulfate ion, and a nitrate ion from the viewpoint that the resistance to thermal decomposition of the ionomer resin is likely to be improved.

More specifically, preferred examples of the salt composed of a strong acid and a strong base include sodium chloride, potassium chloride, magnesium chloride, calcium chloride, sodium sulfate, potassium sulfate, magnesium sulfate, calcium sulfate, sodium nitrate, potassium nitrate, magnesium nitrate, calcium nitrate, sodium p-toluenesulfonate, potassium p-toluenesulfonate, magnesium p-toluenesulfonate, and calcium p-toluenesulfonate. More preferably, the salt may be sodium chloride, potassium chloride, sodium sulfate, potassium sulfate, sodium nitrate, potassium nitrate, still more preferably sodium chloride, sodium sulfate, or sodium nitrate from the viewpoint that the transparency and the heat resistance are likely to be improved.

The amount of salts in the ionomer resin is preferably 1,000 mg/kg or less, and more preferably 700 mg/kg or less from the viewpoint that the transparency, especially the transparency after water absorption, of the ionomer resin is likely to be improved. The amount is still more preferably 400 mg/kg or less, and particularly preferably 300 mg/kg or less from the viewpoint that the transparency, especially the transparency after water absorption of the ionomer resin is likely to be improved. Since less amount of salts in the ionomer resin tends to results in improved transparency (especially, the transparency after water absorption) of the ionomer resin, the lower limit is not particularly limited, and may be, for example, 0 mg/kg or more, and preferably 1 mg/kg or more. The amount of salts in the ionomer resin can be adjusted by the extent of washing in the step (ii) described above, more specifically by the number of washing times. The amount of salts in the ionomer resin can be measured by ion chromatography, for example, by the method described in Examples.

The degree of branching per 1000 carbons in the ionomer resin obtained by the method of the present invention is not particularly limited, and is preferably from 5 to 30, and more preferably from 6 to 20. The degree of branching can be adjusted by the polymerization temperature at which an ethylene-(meth)acrylic acid ester copolymer (X) that is a raw material of the ionomer resin is synthesized. The degree of branching per 1000 carbons can be measured by a DDMAS method using solid-state NMR.

The melting point of the ionomer resin obtained by the method of the present invention is preferably 50° C. or higher, more preferably 60° C. or higher, and still more preferably 80° C. or higher from the viewpoint of heat resistance, and is preferably 200° C. or lower, more preferably 180° C. or lower, and still more preferably 150° C. or lower from the viewpoint that the adhesiveness to substrates is likely to be developed during preparation of the laminated glass. The melting point can be measured according to JIS K7121: 2012. Specifically, the melting point can be determined from the peak top temperature of the melting peak during the second temperature rising, obtained by measurement using a differential scanning calorimeter (DSC) at a cooling rate of −10° C./min and a temperature rising rate of 10° C./min.

The heat of melting of the ionomer resin obtained by the method of the present invention is preferably from 0 J/g to 25 J/g. The heat of melting can be measured according to JIS K7122: 2012. Specifically, the heat of melting can be determined from the area of the melting peak during the second temperature rising, obtained by measurement using a differential scanning calorimeter (DSC) at a cooling rate of −10° C./min and a temperature rising rate of 10° C./min.

In one embodiment of the present invention, the Melt Flow Rate (MFR) of the ionomer resin of the present invention, as measured at 190° C. and 2.16 Kg according to JIS K7210-1: 2014, is preferably 0.1 g/10 min or more, more preferably 0.3 g/10 min or more, still more preferably 0.7 g/10 min or more, even still more preferably 1.0 g/10 min or more, and particularly preferably 1.5 g/10 min or more, and is preferably 50 g/10 min or less, more preferably 30 g/10 min or less, and particularly preferably 10 g/10 min or less. When the MFR of the ionomer resin is the lower limit value or more and the upper limit value or less, a molding process with reduced heat deterioration is likely to be achieved, so that a resin sheet with excellent penetration resistance is likely to be obtained.

The melting point, the heat of melting, and the MFR of the ionomer resin can be adjusted by the molecular weight of the ionomer resin, as well as by the amounts of the (meth)acrylic acid unit (A), the neutralized (meth)acrylic acid unit (B), and the ethylene unit (C), and of the (meth)acrylic acid ester unit (D) that is optionally contained.

The storage elastic modulus (E') at 50° C. of the ionomer resin obtained by the method of the present invention, as measured by a dynamic viscoelasticity measurement, is preferably 20 MPa or more, more preferably 30 MPa or more, still more preferably 40 MPa or more, and particularly preferably 50 MPa or more from the viewpoint of good self-standing properties (i.e., high elastic modulus), especially self-standing properties in high temperature environments (high elastic modulus in high temperature environments). The upper limit of the storage elastic modulus (E') is not particularly limited and may be 1,000 MPa. The storage elastic modulus can be adjusted by the molecular weight of the ionomer resin, as well as by the amounts of the (meth)acrylic acid unit (A), the neutralized (meth)acrylic acid unit (B), and the ethylene unit (C), and of the (meth) acrylic acid ester unit (D) that is optionally contained, of the ionomer resin.

The ionomer resin obtained by the method of the present invention has a reduced amount of salts in the ionomer resin, and thus exhibits high transparency. The haze value of the ionomer resin with a thickness of 0.8 mm is preferably 2.0% or less, more preferably 1.5% or less, and still more preferably 1.0% or less. Lower haze values result in improved transparency of the ionomer resin, and thus, the lower limit value is not particularly limited, and may be, for example, 0.01%. The haze value of the ionomer resin is measured using a haze meter according to JIS K7136: 2000.

Furthermore, the ionomer resin obtained according to the present invention, with salts in the ionomer resin being sufficiently removed, and thus the amount of the salts being small, has high transparency even in a state where the ionomer resin has absorbed water (after water absorption). The haze value in a state where the ionomer resin has absorbed water (haze value after water absorption), in the case where the thickness is 0.8 mm, is preferably 9.0% or less, more preferably 5.0% or less, and still more preferably 3.0% or less. Lower haze values after water absorption result in improved transparency after water absorption of the ionomer resin, and thus, the lower limit value is not particularly limited, and may be, for example, 0.01%. The haze value after water absorption can be measured using a haze meter according to JIS K7136: 2000 by keeping the ionomer resin in a state where it is immersed in an ion exchanged water at 23° C. for 300 hours, removing the ionomer resin from the ion exchanged water, and using the ionomer resin from which water absorbed on the surface is wiped as a test piece. For example, the measurement can be done by the methods described in Examples.

According to the studies by the present inventors, too high crystalline properties of ionomer resins tend to cause whitening in the ionomer resins, and thus to result in deteriorated transparency in a state where the ionomer resin has been slowly cooled to facilitate the crystallization of the resin (transparency after slow cooling). The ionomer resin obtained according to the present invention, in which the total amount of the (meth)acrylic acid unit (A) and the neutralized (meth)acrylic acid unit (B) is 6 mol % or more, is unlikely to undergo crystallization, and thus has high transparency even after slow cooling.

The haze value in a state where the ionomer resin obtained by the method of the present invention has been slowly cooled to facilitate the crystallization of the resin (haze value after slow cooling) is preferably 5.0% or less, more preferably 4.5% or less, still more preferably 4.0% or less, even still more preferably 3.0% or less, and particularly preferably 2.5% or less. Lower haze values result in improved transparency of the ionomer resin, and thus, the lower limit value is not particularly limited, and may be, for example, 0.01%. The haze value after slow cooling can be obtained by placing an ionomer resin with a sheet thickness of 0.8 mm between two glass plates to prepare laminated glass, heating the laminated glass to 140° C., then slowly cooling the laminated glass from 140° C. to 23° C. at a rate of 0.1° C./min, and measuring the haze value with a haze meter according to JIS K7136: 2000.

The ionomer resin obtained by the method of the present invention has low coloring index and is preferably colorless. The yellowness index (YI) of the ionomer resin when it has a thickness of 0.8 mm is preferably 2.0 or less, more preferably 1.8 or less, still more preferably 1.5 or less, and particularly preferably 1.0 or less from the viewpoint of lowering the coloring properties. Lower yellowness indexes (YIs) result in reduced coloring properties of the ionomer resin, and thus, the lower limit value is not particularly limited, and may be, for example, 0. The yellowness index (YI) can be measured using a differential colorimeter according to JIS Z8722: 2009.

[Resin Composition]

Additives may be added as necessary to an ionomer resin obtained according to the method of the present invention to obtain a resin composition. The resin composition in the present invention comprises an ionomer resin obtained according to the method of the present invention and additives.

Examples of the additives that are optionally contained include ultraviolet absorbers, age resistors, antioxidants, heat stabilizers, light stabilizers, anti-agglutination agents, lubricants, mold release agents, polymer processing aids, antistatic agents, flame retardants, pigments, organic dyes, matting agents, and fluorophores. Among these additives, ultraviolet absorbers, age resistors, antioxidants, heat stabilizers, light stabilizers, anti-agglutination agents, lubricants, mold release agents, polymer processing aids, and organic dyes are preferable.

The ultraviolet absorbers are compounds having ultraviolet absorbing capacity and considered as mainly serving to convert light energy to heat energy. Examples of the ultraviolet absorbers include benzophenones, benzotriazoles, triazines, benzoates, salicylates, cyanoacrylates, oxanilides, malonates, and formamidines. These may be used alone or in combination of two or more.

Benzotriazoles, which effectively prevent deterioration of the optical properties, such as coloring caused by UV ray irradiation, are preferred ultraviolet absorbers. Preferred examples of the benzotriazoles include 2-(2H-benzotriazole-2-yl)-4-(1,1,3,3-tetramethylbutyl)phenol (product name: TINUVIN329, produced by BASF SE), 2-(2H-benzotriazol-2-yl)-4,6-bis(1-methyl-1-phenylethyl)phenol (product name: TINUVIN234, produced by BASF SE), 2,2'-methylene bis[6-(2H-benzotriazol-2-yl)-4-t-octylphenol] (product name: ADK STAB LA-31, produced by ADEKA), and 2-(5-octylthio-2H-benzotriazol-2-yl)-6-tert-butyl-4-methylphenol. These may be used alone or in combination of two or more.

Examples of the triazine ultraviolet absorbers include 2,4,6-tris(2-hydroxy-4-hexyloxy-3-methylphenyl)-1,3,5-triazine (product name: ADK STAB LA-F70, produced by ADEKA), and its analogs, hydroxyphenyl triazine ultraviolet absorbers (product name: TINUVIN477 and TINUVIN460, produced by BASF SE), and 2,4-diphenyl-6-(2-hydroxy-4-hexyloxyphenyl)-1,3,5-triazine. These may be used alone or in combination of two or more.

Examples of the age resistors are known materials. Specific examples of the age resistors include phenol compounds such as hydroquinone, hydroquinone monomethyl ether, 2,5-di-t-butylphenol, 2,6-di(t-butyl)-4-methylphenol, mono(or di- or tri-)(α-methylbenzyl)phenol; bisphenol compounds such as 2,2'-methylene bis(4-ethyl-6-t-butylphenol), 4,4'-butylidene bis(3-methyl-6-t-butylphenol), and 4,4'-thiobis(3-methyl-6-t-butylphenol); benzimidazole compounds such as 2-mercaptobenzimidazole and 2-mercaptomethylbenzimidazole; amine-ketone compounds such as 6-ethoxy-1,2-dihydro-2,2,4-trimethylquinoline, a reaction product of diphenylamine and acetone, and 2,2,4-trimethyl-1,2-dihydroquinoline polymer; aromatic secondary amine compounds such as N-phenyl-1-naphthylamine, alkylated diphenylamine, octylated diphenylamine, 4,4'-bis(α,α-dimethyl benzyl)diphenylamine, p-(p-toluene sulfonylamido)diphenylamine, and N,N'-diphenyl-p-phenylenediamine; and thiourea compounds such as 1,3-bis(dimethylaminopropyl)-2-thiourea and tributylthiourea. These may be used alone or in combination of two or more.

The antioxidants are effective in preventing oxidative degradation of resins by themselves in the presence of oxygen. Examples include phosphorus antioxidants, hindered phenolic antioxidants, and thioether antioxidants. These antioxidants may be used alone or in combination of two or more. Among them, phosphorus antioxidants and hindered phenolic antioxidants are preferable, and combinations of a phosphorus antioxidant and a hindered phenolic antioxidant are more preferable, from the viewpoint of the effect of preventing deterioration of the optical properties due to coloring.

When a phosphorus antioxidant and a hindered phenolic antioxidant are combined, the amount of the phosphorus antioxidant used: the amount of the hindered phenolic antioxidant used is preferably from 1:5 to 2:1, and more preferably from 1:2 to 1:1 in mass ratio Preferred examples of the phosphorus antioxidant include 2,2-methylene bis(4,6-di-t-butylphenyl)octylphosphite (product name: ADK STAB HP-10, produced by ADEKA), tris(2,4-di-t-butylphenyl)phosphite (product name: IRGAFOS168, produced by BASF SE), and 3,9-bis(2,6-di-t-butyl-4-methylphenoxy)-2,4,8,10-tetraoxa-3,9-diphosphaspiro[5.5]undecane (product name: ADK STAB PEP-36, produced by ADEKA). These may be used alone or in combination of two or more.

Preferred examples of the hindered phenolic antioxidant include pentaerythrityl-tetrakis[3-(3,5-di-t-butyl-4-hydroxyphenyl)propionate] (product name: IRGANOX1010, produced by BASF SE), and octadecyl-3-(3,5-di-t-butyl-4-hydroxyphenyl)propionate (product name: IRGANOX1076, produced by BASF SE). These may be used alone or in combination of two or more.

The heat stabilizers can prevent heat deterioration of resins by capturing polymer radicals produced when the resins are subjected to high temperatures under substantially oxygen-free conditions. Preferred examples of the heat stabilizers include 2-t-butyl-6-(3'-t-butyl-5'-methyl-hydroxybenzyl)-4-methylphenylacrylate (product name: SUMILIZER GM, produced by Sumitomo Chemical Co., Ltd.), and 2,4-di-t-amyl-6-(3',5'-di-t-amyl-2'-hydroxy-α-methylbenzyl)phenylacrylate (product name: SUMILIZER GS, produced by Sumitomo Chemical Co., Ltd.). These may be used alone or in combination of two or more.

The light stabilizers are compounds that are considered to serve to capture radicals produced mainly by photooxidation. Preferred examples of the light stabilizers include hindered amines such as compounds having a 2,2,6,6-tetraalkylpiperidine backbone. These may be used alone or in combination of two or more.

Examples of the anti-agglutination agents include salts or esters of fatty acids, esters of polyhydric alcohols, inorganic salts, inorganic oxides, and particulate resins. Preferred examples of the anti-agglutination agents include calcium stearate, calcium carbonate, calcium sulfate, magnesium sulfate, barium sulfate, silicon dioxide (product name: AEROSIL, produced by Evonik Industries AG), and particulate acrylic resins. These may be used alone or in combination of two or more.

Examples of the lubricants include stearates, behenates, stearamide, methylenebisstearamide, hydroxystearic acid triglyceride, paraffin waxes, ketone waxes, octyl alcohols, and hardened oils. These may be used alone or in combination of two or more.

Examples of the mold release agents include higher alcohols such as cetyl alcohol and stearyl alcohol; and glycerol higher fatty acid esters such as monoglyceride stearate and diglyceride stearate. These may be used alone or in combination of two or more.

The polymer processing aids to be used are usually polymer particles with particle sizes of from 0.05 to 0.5 μm, which can be manufactured by emulsion polymerization. The polymer particles may be monolayer particles composed of a polymer with single composition ratio and single limiting viscosity, or multilayer particles composed of two or more polymers with different composition ratios or limiting viscosities. These may be used alone or in combination of two or more. Especially preferred are particles with a two-layer structure having a polymer layer with a lower limiting viscosity as the inner layer and having a polymer layer with a higher limiting viscosity of 5 dl/g or more as the outer layer. The limiting viscosities of the polymer processing aids are preferably from 3 to 6 dl/g. Too small limiting viscosities tend to show little improvement effects on the moldability, while too large limiting viscosities tend to result in deterioration of the molding processability of copolymers.

Examples of the organic dyes that are preferably used are compounds that have a function to convert ultraviolet ray to visible ray. The organic dyes may be used alone or in combination of two or more.

Examples of the fluorophores include fluorescent pigments, fluorescent dyes, fluorescent white dyes, fluorescent whitening agents, and fluorescent bleaching agents. These may be used alone or in combination of two or more.

When adding the additives, the amounts of the various additives can be selected as appropriate without impairing the effects of the invention, and the total amount of the various additives is preferably 7% by mass or less, more preferably 5% by mass or less, and still more preferably 4% by mass or less based on the total amount of the resin composition.

The various additives may be added during manufacturing of the ionomer resin, after manufacturing of the ionomer resin, or during manufacturing of a resin sheet as described later.

[Pellet]

The ionomer resin obtained by the method of the present invention and the resin composition in the present invention may be made into pellets or other forms for more convenience in storage, transportation, or molding. Thus, the present invention also encompasses a pellet comprising an ionomer resin obtained by the method of the present invention. Pelletization of ionomer resins and/or resin compositions can be achieved, for example, by cutting a strand obtained by melt extrusion. The temperature of resins or resin compositions during melt extrusion in the case of pelletization by a melt extrusion method is preferably 150° C. or higher, and more preferably 170° C. or higher from the viewpoint that discharge from an extruder is likely to be stabilized. The temperature is preferably 250° C. or lower, and more preferably 230° C. or lower from the viewpoint of preventing the pyrolytic deterioration of resins. Resin pelletization by melt extrusion as described above for the ionomer resin of the present invention and the resin composition in the present invention produces fewer volatile substances and thus less odor, so that the working environment is unlikely to be deteriorated.

[Resin Sheet]

The present invention also encompasses a resin sheet having one or more layer comprising the pellet of the present invention as a resin component. The resin sheet of the present invention has one or more layer comprising the pellet of the present invention as a resin component (hereinafter, also referred to as layer (x)). The layer (x) comprises the ionomer resin of the present invention and optional additives.

The resin sheet of the present invention may comprise a layer (x) only, or a laminate comprising at least one layer (x). The laminate may be, for example, but not limited to, a laminate comprising two or more layers (x), or a laminate comprising one or more layer (x) and one or more other layer. The layer (x) or the other layer is multiple, the resins or the resin compositions that constitute the layers may be the same or different.

Examples of the other layer include layers comprising well-known resins. Examples of the resin that can be used include polyethylene, polypropylene, polyvinyl chloride, polystyrene, polyurethane, polytetrafluoroethylene, acrylic resins, polyamide, polyacetal, polycarbonate, polyesters such as polyethylene terephthalate and polybutyrene terephthalate, cyclic polyolefin, polyphenylene sulfide, polytetrafluoroethylene, polysulfone, polyether sulfone, polyalylate, liquid crystal polymers, polyimide, and thermoplastic elastomers. The other layer may also contain, as necessary, one or more of the additives described above, as well as of additives such as plasticizers, antiblocking agents, pigments, dyes, heat shield materials (e.g., inorganic heat shield particles or organic heat shield materials having infrared ray absorbing capacity), and functional inorganic compounds.

In one preferred embodiment of the present invention, the resin sheet of the present invention has an uneven structure on its surface formed by a conventionally known method, such as melt fractures and embosses, from the viewpoint of excellent foam release properties during thermocompression bonding of the resin sheet and a substrate. The shapes of the melt fractures and embosses may be selected as appropriate from conventionally known shapes.

The thickness of one layer (x) in the resin sheet of the present invention is preferably 0.1 mm or more, more preferably 0.2 mm or more, still more preferably 0.3 mm or more, and particularly preferably 0.4 mm or more, and is preferably 5 mm or less, more preferably 4 mm or less, still more preferably 2 mm or less, and particularly preferably 1 mm or less. When the layer (x) in the resin sheet is multiple, the thickness of one of the multiple layers (x) in the resin sheet may be the same or different.

The thickness of the resin sheet of the present invention is preferably 0.1 mm or more, more preferably 0.2 mm or more, still more preferably 0.3 mm or more, still more preferably 0.4 mm or more, still more preferably 0.5 mm or more, still more preferably 0.6 mm or more, even still more preferably 0.7 mm or more, and particularly preferably 0.75 mm or more, and is preferably 20 mm or less, more preferably 15 mm or less, still more preferably 10 mm or less, still more preferably 5 mm or less, still more preferably 4 mm or less, still more preferably 2 mm or less, and even still more preferably 1 mm or less.

The thickness of the resin sheet is measured by a conventionally known method, for example, using a contact or non-contact thickness gauge. The resin sheet may be rolled up into a roll or in individual sheets.

In preferred embodiments of the present invention, the resin sheet of the present invention may have the same haze value, the haze value after water absorption, the haze value after slow cooling, the storage elastic modulus, and the yellowness index as the ionomer resin of the present invention.

Preferably, the resin sheet of the present invention has lower water content from the viewpoint that it is less likely to undergo foaming and reduction in the adhesiveness to the substrate during the manufacture of the laminated glass. The water content of the resin sheet is preferably 1% by mass or less, more preferably 0.5% by mass or less, still more preferably 0.02% by mass or less, and particularly preferably 0.01% by mass or less. The content can be measured by coulometric titration.

[Method of Manufacturing Resin Sheet]

The method of manufacturing the resin sheet of the present invention is not particularly limited. For example, an ionomer resin of the present invention and optional additives are mixed homogeneously, and then can be subjected to known film-formation methods, such as extrusion, calender, press, solution casting, melt casting, and inflation methods, to manufacture a layer (x). The layer (x) alone may be used as the resin sheet. Alternatively, as desired, two or more layers (x), or one or more layer (x) and one or more other layer may be laminated by press molding or other methods to form a laminated resin sheet, or two or more layers (x), or one or more layer (x) and one or more other layer may be molded by a co-extrusion method to form a laminated resin sheet. The layer (x) or the other layer is multiple, the resins or the resin compositions that constitute the layers may be the same or different.

Among known film-formation methods, methods of manufacturing resin sheets using an extruder are suitably used. The resin temperature during extrusion is preferably 150° C. or higher, and more preferably 170° C. or higher from the viewpoint that discharge of the resin from an extruder is likely to be stabilized and that mechanical troubles are likely to be reduced. The resin temperature during extrusion is preferably 250° C. or lower, and more preferably 230° C. or lower from the viewpoint that resin decomposition and resin deterioration accompanied by decomposition are likely to be reduced. For efficient removal of volatile materials, volatile materials are preferably removed by vacuum from a vent port of an extruder.

[Laminated Glass Interlayer and Laminated Glass]

The resin sheet of the present invention is suitably used as a laminated glass interlayer (also referred to as simply "interlayer"). Thus, the present invention includes a laminated glass interlayer comprising the resin sheet of the present invention. The present invention also encompasses laminated glass comprising two glass plates, and the laminated glass interlayer according to the present invention positioned between the two glass plates. The laminated glass of the present invention has a laminated glass interlayer comprising the resin sheet, and thus can exhibit excellent transparency.

Examples of the glass plate that can be used to be laminated with the interlayer of the present invention include inorganic glass such as float plate glass, polished plate glass, figured plate glass, wire plate glass, and heat absorbing plate glass, as well as conventionally known organic glass such as polymethyl methacrylate and polycarbonate. These glass plates may be colorless or colored. These may be used alone or in combination of two or more. The thickness of one glass plate is preferably 100 mm or less, and the thicknesses of two glass plates may be the same or different.

Laminated glass comprising the resin sheet of the present invention placed between two sheets of glass can be manufactured by a conventionally known method. The method may be, for example, a method using a vacuum laminator, a vacuum bag, a vacuum ring, or a nip roll. Alternatively, a method comprising temporary bonding by the above method and subsequent autoclaving for full bonding may be used.

When a vacuum laminator is used, a glass plate, an interlayer, and optional layers (e.g., an adhesive resin layer) can be laminated, for example, under reduced pressure of $1\times10^{-6}$ to $1\times10^{-1}$ MPa, at 60 to 200° C., especially at 80 to 160° C., to manufacture laminated glass. The method using a vacuum bag or a vacuum ring is described, for example, in EP 1235683 B1, and a glass plate, an interlayer, and optional layers can be laminated under a pressure of about $2\times10^{-2}$ to $3\times10^{-2}$ MPa, at 100 to 160° C. to manufacture laminated glass.

The manufacturing method using a nip roll may be, for example, a method comprising laminating a glass plate, an interlayer, and optional layers, degassing the laminate at a temperature lower than the flow beginning temperature of the interlayer with rolls, and press-bonding the laminate at a temperature near the flow beginning temperature. Specifically, the method may be, for example, a method comprising heating the laminate to 30 to 70° C. with an infrared heater or the like, degassing it with rolls, heating it to 50 to 120° C., and then press-bonding it with rolls.

In the case of press bonding using the method as described above followed by introduction into an autoclave for further press bonding, the operating conditions of the autoclave step are selected as appropriate based on the thickness and structure of the laminated glass. For example, treatment under a pressure of 0.5 to 1.5 MPa at 100 to 160° C. for 0.5 to 3 hours is preferable.

The ionomer resin obtained by the method of the present invention has high transparency and high adhesiveness to glass, so that the laminated glass of the present invention has excellent transparency. In one embodiment of the present invention, the haze value of the laminated glass when the thickness of the interlayer is 0.8 mm is preferably 1.0% or less, more preferably 0.8% or less, and still more preferably 0.5% or less. Lower haze values result in improved transparency of the ionomer resin, and thus, the lower limit value is not particularly limited, and may be, for example, 0.01%. The haze value of the laminated glass is measured using a haze meter according to JIS K7136: 2000.

In one embodiment of the present invention, the laminated glass of the present invention has excellent transparency even after being heated to 140° C., and then slowly cooled from 140° C. to 23° C. at a rate of 0.1° C./min. The haze value of the laminated glass with the interlayer having a sheet thickness of 0.8 mm after being heated to 140° C. and then slowly cooled from 140° C. to 23° C. at a rate of 0.1° C./min (haze value after slow cooling) is preferably 5.0% or less, more preferably 4.5% or less, still more preferably 4.0% or less, and particularly preferably 3.0% or less. Lower haze values result in improved transparency of the laminated glass and thus, the lower limit value is not particularly limited, and may be, for example, 0.01%. The haze value after slow cooling is also measured using a haze meter according to JIS K7136: 2000.

Preferably, the laminated glass of the present invention is less colored and is colorless whenever possible. The yellowness index (YI) of the laminated glass of the present invention when the interlayer has a sheet thickness of 0.8 mm is preferably 2.0 or less, more preferably 1.8 or less, still more preferably 1.5 or less, and particularly preferably 1.0 or less. Lower yellowness indexes (YIs) result in reduced coloring properties of the ionomer resin, and thus, the lower limit value is not particularly limited, and may be, for example, 0. The yellowness index (YI) can be measured using a differential colorimeter according to JIS Z8722: 2009.

The adhesion between the laminated glass and the interlayer of the present invention is measured, for example, by a compression shear strength test described in WO 1999-058334 A2. The compression shear strength is preferably 15 MPa or more, more preferably 20 MPa or more, and particularly preferably 25 MPa or more, from the viewpoint that the adhesion is likely to be improved. The compression shear strength may be 50 MPa or less from the viewpoint that the penetration resistance of the laminated glass is likely to be improved.

As described above, the resin sheet having one or more layer comprising the pellet of the present invention as a resin component is useful as a laminated glass interlayer. The laminated glass interlayer is especially useful as an interlayer of laminated glass for structural materials (for facade) because it has excellent adhesiveness to glass or other substrates, transparency, and self-standing properties.

Not only as an interlayer of laminated glass for structural materials, the laminated glass of the present invention can also be suitably used in automotive front windshields, automotive side windshields, automotive sunroofs, automotive rear windshields, head up display glass, laminates for exterior walls and roofs, panels, doors, windows, walls, roofs, sunroofs, sound-insulating walls, display windows, balconies, parapets and other building materials, partition glass materials for meeting room, and solar panels.

EXAMPLES

The present invention will be described in detail below with reference to examples and comparative examples but is not limited to the examples.

[Amounts of Monomeric Units of Crude Ionomer Resin]

Ionomer resins obtained in Examples and Comparative Examples were analyzed to determine the amounts of the monomeric units, a (meth)acrylic acid unit (A), a neutralized (meth)acrylic acid unit (B), an ethylene unit (C), and a (meth)acrylic acid ester unit (D), in the ionomer resins as described below. The amounts described above correspond to the amounts of the monomeric units of the crude ionomer resins in Examples and Comparative Examples.

The ionomer resins obtained in Examples and Comparative Examples were dissolved in a mixed solvent of dehydrated toluene/dehydrated ethyl acetate (75/25% by mass), reacted at 100° C. for 2 hours, and reprecipitated in a mixed solvent of acetone/water (80/20% by mass) to convert neutralized (meth)acrylic acid units (B) to (meth)acrylic acid units (A). The obtained resins were sufficiently washed with water and dried. Then, the dried resins were subjected to the following (1) to (3).

(1) Component analysis was performed on the monomeric units constituting the resins by pyrolysis GC-MS.
(2) The acid values of the resins according to JIS K0070: 1992 were measured.
(3) $^1$H-NMR (400 MHz, JEOL Ltd.) measurement was performed on the resins using a mixed solvent of deuterated toluene and deuterated methanol.
(4) The ionomer resins obtained in Examples and Comparative Examples were subjected to microwave digestion pretreatment with nitric acid, and then the types and amounts of the metal ions of the neutralized (meth)acrylic acid units (B) were determined by ICP optical emission spectrometry (Thermo Fisher Scientific iCAP6500Duo).

Based on (1) described above, the types and structures of the (meth)acrylic acid ester unit (D) and the (meth)acrylic acid unit (A) were identified. Based on the information, as well as on the information from (2) and (3) described above, the ratio of the ethylene unit (C)/the (meth)acrylic acid ester unit (D)/(the total of the (meth)acrylic acid unit (A) and the neutralized (meth)acrylic acid unit (B)) was determined. In addition, based on the information from (4) described above, the ratio of the ethylene unit (C)/the (meth)acrylic acid ester unit (D)/the (meth)acrylic acid unit (A)/the neutralized (meth)acrylic acid unit (B) was determined.

The amounts of the monomeric units of the ethylene-(meth)acrylic acid ester copolymer (X) as a raw material were determined by dissolution in deuterated toluene or deuterated THF, followed by measurement by $^1$H-NMR (400 MHz, JEOL Ltd.).

[Fluidity (Melt Flow Rate (MFR))]

The melt flow rates of the raw material resins used in Examples and Comparative Examples, and of the ionomer resins obtained in Examples and Comparative Examples were measured according to JIS K7210-1: 2014. Specifically, the resins were melted in a cylinder, and extruded from a die positioned at the bottom of the cylinder and having a nominal hole size of 2.095 mm at 190° C. and at a load of 2.16 kg, and the amounts of the resin extruded per 10 minutes (g/10 min) were measured.

[Peak Top Particle Size]

The particle size distribution of the precipitated granular resins was measured using a laser diffraction/scattering particle diameter distribution analyzer (product name: LA-950, produced by Horiba, Ltd.). The particle size at the peak top in a graph obtained by plotting the particle size (μm) in abscissa and the frequency (%) in ordinate was used the peak top particle size. In the case where two or more peaks were obtained, the particle size at the peak with highest frequency was considered as the peak top particle size.

[Amount of Salt Composed of Strong Acid and Strong Base in Ionomer Resin (Amount of Remaining Inorganic Salt)]

After 0.1 g of the ionomer resin each obtained in Examples and Comparative Examples was weighed out, 10 mL of ultrapure water was added to the resin and heated at 90° C. for 1 hour. Thereafter, the resulting product was allowed to cool and filtered through a filter with 0.45-μm mesh size. The filtrate obtained by the filtration was used as a sample solution and measured by ion chromatography (Shimadzu Corporation) under the conditions described below. Based on the peak area obtained by the measurement, the amount of chloride ions or sulfate ions was determined. The amount of chloride ions or sulfate ions was converted to the amount of sodium salts, thereby determining the amount of remaining inorganic salts.

(Measurement Conditions)

Eluent: mixed solution of an aqueous sodium carbonate solution (0.6 mmol/L) and an aqueous sodium bicarbonate solution (12 mmol/L);

Flow rate: 1.0 mL/min;

Column temperature: 40° C.;

Column: IC-SA2 (250 L×4.0).

[Manufacturing Efficiency (Filterability)]

The dispersion of the granular resins obtained by the method described later was pressure-filtered using a filter paper with 1-μm mesh size under a pressure of 0.1 MPa, and the filterability was evaluated according to the criteria described below. The filterability was considered as an index of manufacturing efficiency.

(Criteria for Evaluation of Filterability)

A: Particulate sediment was obtained without clogging of the filter paper;

B: The obtained particulate sediment was immersed due to clogging of the filter paper.

[Transparency after Water Absorption (Haze Value after Water Absorption) of Ionomer Resin]

The particulate ionomer resins obtained in Examples and Comparative Examples were each melt-kneaded at 210° C., and the melt-kneaded product was compression-molded under heating at 210° C. and a pressure of 4.9 MPa (50 kgf/cm²) for 5 minutes to obtain a resin sheet with a thickness of 0.8 mm. The obtained resin sheet was cut out into 50 mm square pieces, and the cut-out sample was continued to be immersed in ion exchanged water at 23° C. for 300 hours to obtain a water-absorbed sample. After wiping water attached to the surface of the water-absorbed sample removed from the ion exchanged water, the haze value of the water-absorbed sample was measured using a haze meter HZ-1 (Suga Test Instruments Co., Ltd.) according to JIS K7136: 2000.

[Transparency after Slow Cooling (Haze Value after Slow Cooling) of Ionomer Resin]

A resin sheet obtained in the same manner as the method described above was sandwiched between two sheets of float glass with a thickness of 2.7 mm. Using a vacuum laminator (1522N, produced by Nisshinbo Mechatronics Inc.), the inside of which was vacuumed at 100° C. for 1 minute, the laminate was pressed at 30 kPa for 5 minutes while maintaining the degree of vacuum and the temperature to obtain a temporally bonded body. The obtained temporally bonded body was introduced into an autoclave and processed at 140° C. and 1.2 MPa for 30 minutes to obtain laminated glass.

The laminated glass obtained according to the method described above was heated to 140° C., and then slowly cooled to 23° C. at a rate of 0.1° C./min. The haze value of the laminated glass after the slow cooling operation was measured using a haze meter HZ-1 (Suga Test Instruments Co., Ltd.) according to JIS K7136: 2000.

[Raw Material Resin]

the methyl methacrylate (MMA) modified amounts, the ethyl acrylate (EA) modified amounts and the MFRs, of the ethylene-(meth)acrylic acid ester copolymers (X) used as raw materials of the ionomer resins in Examples and Comparative Examples are shown in Table 1.

"ACRYFT" (Registered Trademark) WH401F, produced by Sumitomo Chemical Co., Ltd. was used as EMMA1, and "REXPEARL" (Registered Trademark) A4250, produced by Japan polyethylene Corporation was used as EEA1.

TABLE 1

| | MMA or EA modified amount | | MFR |
|---|---|---|---|
| | mass % | mol % | g/10 min |
| EMMA1 | 20 | 6.5 | 20 |
| EMMA2 | 25 | 8.5 | 7 |
| EMMA3 | 25 | 8.5 | 150 |
| EMMA4 | 18 | 5.8 | 7 |
| EEA1 | 25 | 8.5 | 5 |

Example 1

To a SUS pressure vessel, 100 parts by mass of EMMA2 in Table 1 was introduced, and 233 parts by mass of toluene was added and stirred at 60° C. under an increased pressure of 0.02 MPa to dissolve EMMA2. To the obtained solution, 96 parts by mass of a solution of sodium hydroxide (20% by mass) in methanol was added, and the mixture was stirred at 100° C. for 4 hours to saponify EMMA2, thereby converting some of the methyl methacrylate units to sodium methacrylate units. Then, after cooling the solution to 50° C., 83 parts by mass of hydrochloric acid (20% by mass) was added and stirred at 50° C. for 1 hour to convert some of the sodium methacrylate units to methacrylic acid, thereby obtaining a crude ionomer resin solution.

To the obtained crude ionomer resin solution, a mixed solvent of toluene/methanol (75/25% by mass) was added to achieve a crude ionomer resin concentration of 10% by mass, thereby completing dilution of the solution. Then, after adjusting the temperature of the obtained diluted solution of the crude ionomer resin to 34° C., 430 parts by mass of methanol at 34° C. was added to 100 parts by mass of the diluted solution of the crude ionomer resin, to allow granular resins to be precipitated. Thereafter, the obtained granular resin dispersion was filtered to collect the granular resins, and then 100 parts by mass of the collected granular resins and 600 parts by mass of a mixed solvent of water/methanol (50/50% by mass) were mixed. Slurries obtained by the mixing process were stirred at 40° C. for 1 hour, and then granular resins were collected by filtration at room temperature. The granular resins were further washed with a mixed solvent of water/methanol (50/50% by mass) three times to obtain a washed ionomer resin 1.

The obtained ionomer resin 1 was dried in reduced pressure for 8 hours or longer for further analysis and characterization. The results from the analysis and characterization of the ionomer resin 1 are shown in Table 2.

Example 2

An ionomer resin 2 was obtained in the same manner as in Example 1, except that EMMA2 was changed to EMMA3, and that the temperatures of the diluted solution of the crude ionomer resin and methanol were changed from 34° C. to 37° C. The results from the analysis and characterization of the obtained ionomer resin 2 are shown in Table 2.

Example 3

An ionomer resin 3 was obtained in the same manner as in Example 1, except that EMMA2 was changed to EMMA3, and that the temperatures of the diluted solution of the crude ionomer resin and methanol were changed from 34° C. to 40° C. The results from the analysis and characterization of the obtained ionomer resin 3 are shown in Table 2.

Example 4

An ionomer resin 4 was obtained in the same manner as in Example 3, except that 220 parts by mass of sulfuric acid (30% by mass) was added instead of hydrochloric acid. The results from the analysis and characterization of the obtained ionomer resin 4 are shown in Table 2.

Example 5

An ionomer resin 5 was obtained in the same manner as in Example 1, except that EMMA2 was changed to EEA1, that the concentration of the diluted solution of the crude ionomer resin was changed from 10% by mass to 6% by mass, and that the temperatures of the diluted solution of the crude ionomer resin and methanol were changed from 34° C. to 41° C. The results from the analysis and characterization of the obtained ionomer resin 5 are shown in Table 2.

Example 6

An ionomer resin 6 was obtained in the same manner as in Example 1, except that EMMA2 was changed to EMMA1, the amount of the solution of sodium hydroxide (20% by mass) in methanol was changed from 96 parts by mass to 73 parts by mass, that the amount of hydrochloric acid (20% by mass) added was changed from 83 parts by mass to 63 parts by mass, and that the temperatures of the diluted solution of the crude ionomer resin and methanol were changed from 34° C. to 37° C. The results from the analysis and characterization of the obtained ionomer resin 6 are shown in Table 2.

Comparative Example 1

An ionomer resin 7 was obtained in the same manner as in Example 1, except that the concentration of the diluted solution of the crude ionomer resin was changed from 10% by mass to 3% by mass, and that the temperatures of the diluted solution of the crude ionomer resin and methanol were changed from 34° C. to 40° C. The results from the analysis and characterization of the obtained ionomer resin 7 are shown in Table 2.

Comparative Example 2

An ionomer resin 8 was obtained in the same manner as in Example 1, except that the temperatures of the diluted solution of the crude ionomer resin and methanol were changed from 34° C. to 46° C. The results from the analysis and characterization of the obtained ionomer resin 8 are shown in Table 2.

Comparative Example 3

An ionomer resin 9 was obtained in the same manner as in Example 1, except that 220 parts by mass of sulfuric acid (30% by mass) was added instead of hydrochloric acid, and that the temperatures of the diluted solution of the crude ionomer resin and methanol were changed from 34° C. to 50° C. The results from the analysis and characterization of the obtained ionomer resin 9 are shown in Table 2.

Comparative Example 4

Granular resins were obtained by using EMMA3 instead of EMMA2 and subjecting the crude ionomer resin solution to reprecipitation in 500 parts by mass of a mixed solvent of acetone/water (80/20% by mass) relative to 100 parts by mass of the crude ionomer resin. The obtained granular resins were flaky, and thus the particle sizes were unmeasurable. An ionomer resin 10 was obtained in the same manner as in Example 1, except that the obtained granular resins were washed with a mixed solvent of acetone/water (20/80% by mass) three times. The results from the analysis and characterization of the obtained ionomer resin 10 are shown in Table 2.

Comparative Example 5

An ionomer resin 11 was obtained in the same manner as in Example 1, except that EMMA2 was changed to EMMA4, that the amount of the solution of sodium hydroxide (20% by mass) in methanol added was changed from 96 parts by mass to 66 parts by mass, and that the amount of hydrochloric acid (20% by mass) added was changed from 83 parts by mass to 57 parts by mass. The results from the analysis and characterization of the obtained ionomer resin 11 are shown in Table 2.

TABLE 2

| | | crude ionomer resin/ionomer resin | | | | | | |
|---|---|---|---|---|---|---|---|---|
| | | monomeric unit | | | | | precipitation conditions/particle size | | |
| | raw | amounts of units | | | total amount | | precipitation | precipitation | peak top |
| | material resin | A mol % | B mol % | D mol % | A + B mol % | A + B + D mol % | temperature ° C. | concentration mass % | particle size μm |
| Ex. 1 | EMMA2 | 6.7 | 1.7 | 0.1 | 8.4 | 8.5 | 34 | 10 | 100 |
| Ex. 2 | EMMA3 | 6.7 | 1.7 | 0.1 | 8.4 | 8.5 | 37 | 10 | 260 |
| Ex. 3 | EMMA3 | 6.7 | 1.7 | 0.1 | 8.4 | 8.5 | 40 | 10 | 520 |
| Ex. 4 | EMMA3 | 6.7 | 1.7 | 0.1 | 8.4 | 8.5 | 40 | 10 | 480 |
| Ex. 5 | EEA1 | 6.7 | 1.7 | 0.1 | 8.4 | 8.5 | 41 | 6 | 500 |
| Ex. 6 | EMMA1 | 5.0 | 1.3 | 0.2 | 6.3 | 6.5 | 37 | 10 | 350 |
| Com. Ex. 1 | EMMA2 | 6.7 | 1.7 | 0.1 | 8.4 | 8.5 | 40 | 3 | 30 |
| Com. Ex. 2 | EMMA2 | 6.7 | 1.7 | 0.1 | 8.4 | 8.5 | 46 | 10 | 890 |
| Com. Ex. 3 | EMMA2 | 6.7 | 1.7 | 0.1 | 8.4 | 8.5 | 50 | 10 | 1000 |
| Com. Ex. 4 | EMMA3 | 6.7 | 1.7 | 0.1 | 8.4 | 8.5 | — | — | — |
| Com. Ex. 5 | EMMA4 | 4.5 | 1.2 | 0.1 | 5.7 | 5.8 | 34 | 10 | 420 |

| | crude ionomer resin/ionomer resin remaining inorganic salt | | fluidity | | evaluation result | |
|---|---|---|---|---|---|---|
| | | | | | transparency | |
| | | | | | haze value after water | haze value after slow |
| | type | amount mg/kg | MFR g/10 min | efficiency filterability | absorption % | cooling % |
| Ex. 1 | NaCl | 10 | 0.1 | A | 1.4 | 2.0 |
| Ex. 2 | NaCl | 40 | 1.6 | A | 1.3 | 1.8 |
| Ex. 3 | NaCl | 83 | 1.6 | A | 2.0 | 1.0 |
| Ex. 4 | Na$_2$SO$_4$ | 281 | 1.7 | A | 1.3 | 1.3 |
| Ex. 5 | NaCl | 100 | 0.1 | A | 1.6 | 3.5 |
| Ex. 6 | NaCl | 150 | 0.4 | A | 1.6 | 4.8 |
| Com. Ex. 1 | NaCl | 10 | 0.1 | B | 1.2 | 1.3 |
| Com. Ex. 2 | NaCl | 1100 | 0.1 | A | 66 | 4.2 |
| Com. Ex. 3 | Na$_2$SO$_4$ | 1780 | 0.1 | A | 35 | 9.4 |
| Com. Ex. 4 | NaCl | 0 | 1.6 | B | 1.2 | 2.8 |
| Com. Ex. 5 | NaCl | 90 | 0.1 | A | 1.3 | 12 |

As shown in Table 2, the ionomer resins obtained in Examples 1 to 6 were found to have low haze values after water absorption and low haze values after slow cooling, and have excellent transparency, as well as have good filterability. In contrast, the ionomer resins obtained in Comparative Examples 2, 3, and 5 showed poor results in at least one of the haze value after water absorption and the haze value after slow cooling. Comparative Examples 1 and 4 resulted in lower filterability.

The invention claimed is:

1. A method of manufacturing an ionomer resin, comprising the steps of:
   (i) adding a poor solvent to a crude ionomer resin solution comprising a (meth)acrylic acid unit (A), a neutralized (meth)acrylic acid unit (B) and an ethylene unit (C) to allow a granular resin with a peak top particle size of from 50 to 700 μm to be precipitated; and
   (ii) washing the precipitated granular resin with a washing solution;
   wherein the total amount of the unit (A) and the unit (B) is from 6 to 10 mol % based on the entire monomeric units constituting the crude ionomer resin.

2. The method of manufacturing an ionomer resin according to claim 1, wherein the crude ionomer resin further comprises a (meth)acrylic acid ester unit (D); and wherein the total amount of the unit (A), the unit (B) and the unit (D) is from 6 to 10 mol % based on the entire monomeric units constituting the crude ionomer resin.

3. The method of manufacturing an ionomer resin according to claim 1, wherein the concentration of the crude ionomer resin in the solution is from 1 to 30% by mass.

4. The method of manufacturing an ionomer resin according to claim 1, wherein a temperature of the crude ionomer resin solution is from 25 to 60° C.

5. The method of manufacturing an ionomer resin according to claim 1, wherein the poor solvent is water, an alcohol, or a mixed solvent thereof.

6. The method of manufacturing an ionomer resin according to claim 1, wherein the washing solution is water, an alcohol, or a mixed solution thereof.

7. The method of manufacturing an ionomer resin according to claim 1, wherein an amount of a salt composed of a strong acid and a strong base in the ionomer resin is 1,000 mg/kg or less.

8. The method of manufacturing an ionomer resin according to claim 1, wherein an amount of a salt composed of a strong acid and a strong base in the ionomer resin is 400 mg/kg or less.

* * * * *